Nov. 10, 1925.

J. F. KLINE 1,561,170

CARROUSEL

Filed July 5, 1924

INVENTOR
James F. Kline.
BY Arthur C. Brown
ATTORNEY

Patented Nov. 10, 1925.

1,561,170

UNITED STATES PATENT OFFICE.

JAMES F. KLINE, OF AMARILLO, TEXAS.

CARROUSEL.

Application filed July 5, 1924. Serial No. 724,228.

*To all whom it may concern:*

Be it known that I, JAMES F. KLINE, a citizen of the United States, residing at Amarillo, in the county of Potter and State of Texas, have invented certain new and useful Improvements in Carrousels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to carrousels and the primary object thereof is to provide a simple form of carrousel which in addition to having rotative movement will have a movement causing the seats to traverse a path similar to a sinusoidal curve so as to provide a wavy rotative movement to the seats and the invention consists in certain novel parts and combinations of parts, all of which will be specifically described hereinafter, reference being had to the accompanying drawings, in which Fig. 1 is a perspective view of a carrousel embodying the features of my invention.

Figure 1:
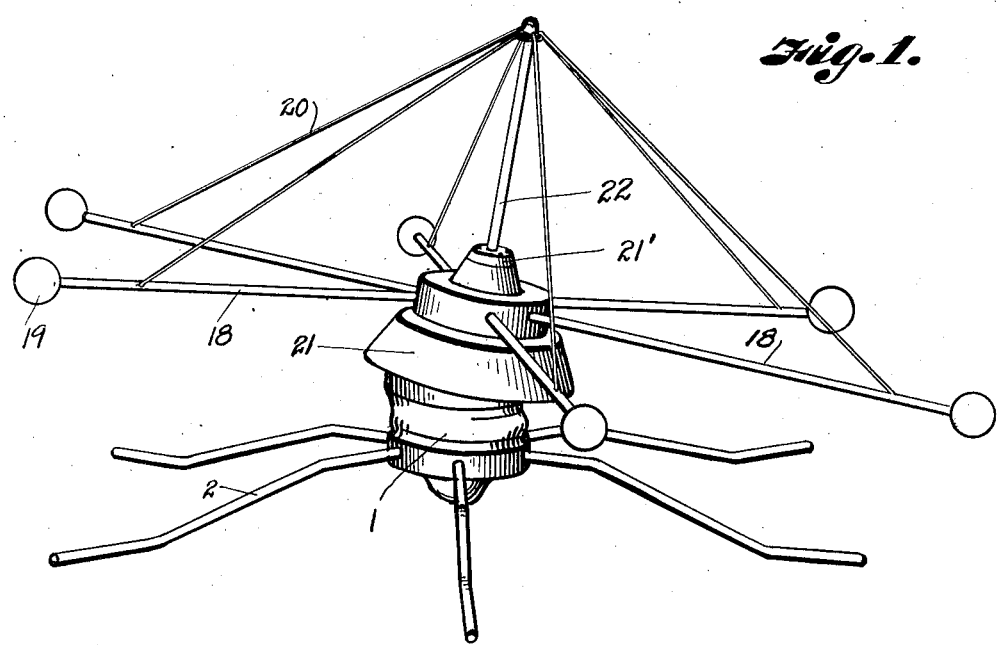
Figure 2:
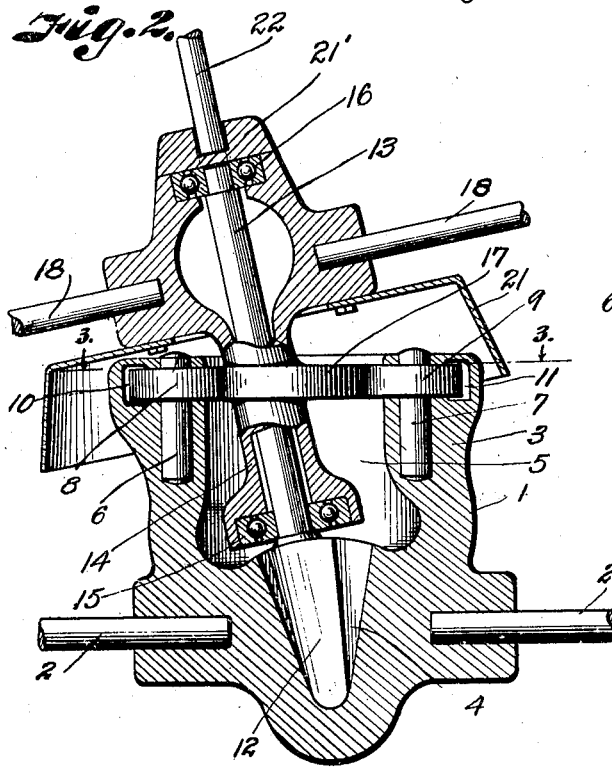
Fig. 2 is a vertical longitudinal sectional view through part of the base and part of the rotor, the spindle and cam as well as the cam rollers being shown in edge elevation.
Figure 3:
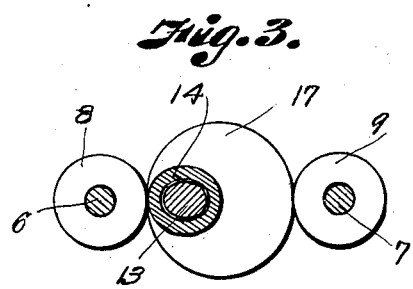
Fig. 3 is a plan view of the cam and cam rollers.
Figure 4:
Fig. 4 is a detailed perspective view of the foot end of the spindle.

The base 1 is provided with suitable legs 2. The base 1 is provided with a cup shaped member 3 having a bottom recess 4 and an enlarged portion 5 in the vertical wall of which are mounted studs 6 and 7 carrying rollers 8 and 9 in the recesses 10 and 11. In the bottom recess 4 is a wedge shaped foot 12 for the spindle 13. The spindle 13 passes through a hub 14 supported on the spindle by the ball bearings 15 and 16. The hub is integral with but eccentric to the cam disk 17 in the plane of the rollers 8 and 9 and between them so that there is rolling contact between the edges of the rollers 8 and 9 and the cam 17.

The hub carries radial arms 18 on which are suitable seats or supports 19 of appropriate construction. Above the spindle and secured to the hub is a suitable socket member 21' in which is mounted a central tie rod 22 which is connected to the arms 18 by braces or rods 20. The socket member 21' may be fastened to the hub in any appropriate manner. The hub carries a shroud 21 in the form of an inverted pan which is of sufficient diameter to enclose the upper end of the member 3 so as to protect the interior of the member 3 from dust, dirt and other elements, it being understood of course that the parts in the element 3 will be lubricated, therefore it is desirable that dust and water are kept out of the space 5.

The carrousel can be turned by any appropriate means so that the hub will rotate on the spindle 13 and as the hub rotates, the axial position of the hub will change continuously due to the fact that the axis of the hub is eccentric to the axis of the disk or cam 17. Therefore the seats 19 will traverse a sinusoidal path presenting a wavy motion in addition to the rotative motion to the seats.

The device is simple in construction, easily manufactured and assembled and the parts can be readily removed for inspection and repairs.

What I claim and desire to secure by Letters-Patent is:

1. A carrousel comprising a base having a recessed member, a spindle mounted in the member to rock back and forth in a definite plane, a hub rotatably mounted on the spindle, passenger-carrying means on the hub, a cam on the hub, and rollers carried by the base, bearing against the cam on the hub.

2. A carrousel comprising a base having a recessed portion, a spindle having a wedge-shaped foot movable back and forth in said recessed portion, a hub rotatably mounted on the spindle, passenger carrying means on the hub, a horizontal, rotatable cam disk fastened on the hub, and rollers carried by the base and bearing against the cam disk.

3. A carrousel comprising a base having a recessed portion, a spindle having a wedge-shaped foot movable back and forth in said recessed portion, a hub rotatably mounted on the spindle, passenger-carrying means on the hub, a horizontal, rotatable cam disk fastened on the hub, rollers carried by the base bearing against the cam disk, radial arms carried by the hub, and a cover carried by the hub enclosing the upper end of the base.

4. A carrousel comprising a recessed portion, a spindle seated in said recessed portion and movable back and forth across the base in a definite vertical plane, a hub rotatably mounted on the spindle, passenger-carrying means carried by the hub, rollers carried by the base, and a disk eccentrically carried by the hub having its edge bearing against the rollers.

5. A carrousel comprising a base having a recessed portion, diametrically opposite rollers carried by the base, a spindle mounted in said recessed portion and movable across the same in a definite vertical plane, a hub rotatably mounted on the spindle, passenger-carrying means carried by the hub, and a disk eccentrically carried by the hub and having its edge, at diametrically opposite points, bearing against the diametrically located rollers.

In testimony whereof I affix my signature.

JAMES F. KLINE.